W. S. Kirkham,

Latch,

No. 1,362, Reissued Dec. 9, 1862.

Witnesses

Jno. J. Bartholomew.

Levi S. Parsons.

Inventor:

William S. Kirkham

AM. PHOTO-LITHO. CO. N.Y. (OSBORNE'S PROCESS.)

UNITED STATES PATENT OFFICE.

CHARLES A. MILLER, OF PHILADELPHIA, PENNSYLVANIA, ASSIGNEE OF W. S. KIRKHAM, OF BRANFORD, CONNECTICUT.

IMPROVEMENT IN LOCKS AND LATCHES.

Specification forming part of Letters Patent No. 23,254, dated March 15, 1859; Reissue No. 1,362, dated December 9, 1862.

*To all whom it may concern:*

Be it known that I, CHARLES A. MILLER, of Philadelphia, Pennsylvania, have, by deed of assignment duly recorded in the United States Patent Office, become the sole owner of Letters Patent for Improvements in Locks and Latches, granted to the late W. S. KIRKHAM, on the 15th day of March, A. D. 1859; and believing the said Letters Patent to be inoperative and invalid by reason of defective specification, I do hereby declare the following to be a full, clear, and exact description of the said invention, reference being had to the accompanying drawings and to the letters of reference marked thereon.

The invention of the aforesaid W. S. KIRKHAM relates to an improvement in that class of door-locks and keepers for the same which can be applied to a left or right hand door, and which have received the name of "Janus-faced locks," the said invention consisting of a keeper having two inclined planes in combination with the latch of a "Janus-faced lock," when the said latch is pivoted to the lock and arranged to vibrate substantially in the manner described hereinafter, so that whether the keeper be secured to the right or left hand of a door-casing, one or other of the said inclined planes shall serve, on the closing of the door, to direct the latch into or behind the keeper, substantially in the manner explained hereinafter.

In order to enable others skilled in the art to make and use the said invention, I will now proceed to describe its construction and operation.

Figure 1:
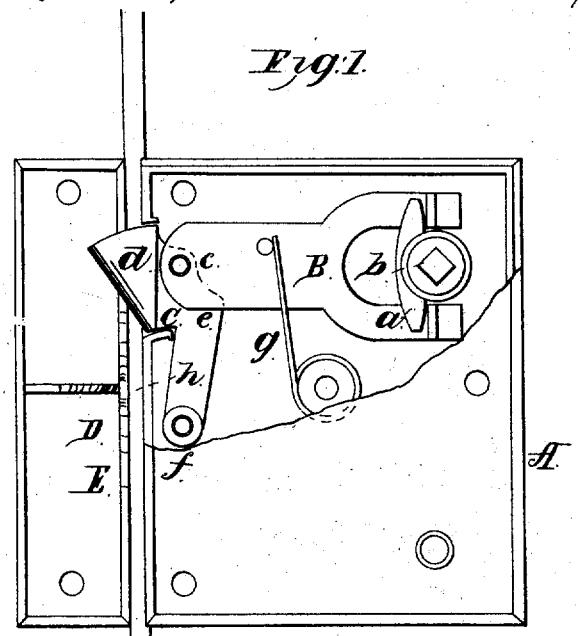
Figure 2:
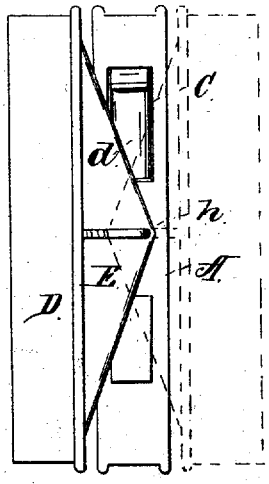

On reference to the accompanying drawings, which form a part of this specification, Figure 1 is a front view of a "Janus-faced lock" and keeper, illustrating an example of the invention of the said W. S. KIRKHAM, a portion of the case of the lock being removed so as to exhibit the interior; Fig. 2, an end view of the lock and keeper, and Fig. 3 a sectional plan of the same on the line 1 2, Fig. 1.

Similar letters refer to similar parts throughout the several views.

Figure 3:
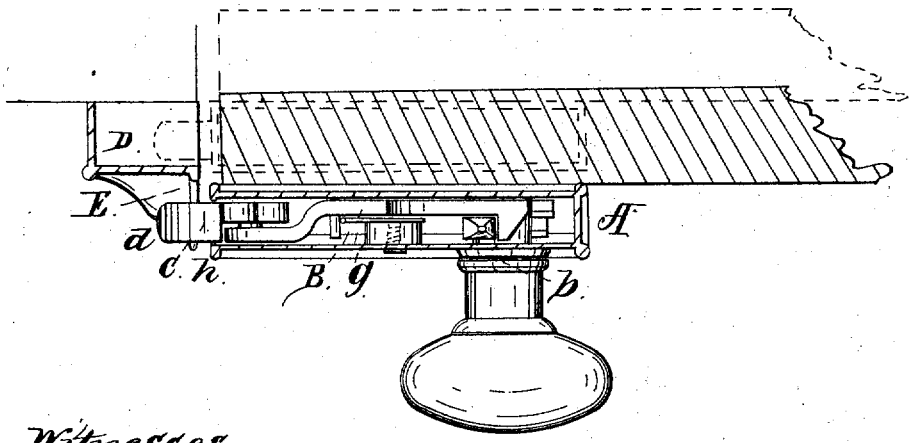

A represents the case of the lock, which case may be of the rectangular form shown in the drawings, or of any other form which the manufacturer may deem most appropriate, both sides of the case being made precisely alike, so that whichever side be secured to the door the case will present a neat and finished exterior. B is a slide arranged within the case A, and this slide is operated by one or the other of the arms *a a* of the hub *b*, through which passes the usual square spindle carrying the ordinary knobs. The latch is connected, by means of a pin, *c*, to the outer end of the slide B, the said latch consisting of an elbow-shaped arm, *e*, hung to the case of the lock by means of a pin, *f*, as much of the upper end, *d*, of the arm as projects beyond the edge of the case being of the angular form represented in Fig. 1, and the inclined edge of this projecting portion of the arm or latch being slightly rounded or beveled, as seen in Fig. 3. A spring, *g*, bearing against the slide B, tends to keep the angular portion *d* of the arm out of the case and in the position shown in Fig. 1. D is the keeper, which receives the angular projecting portion *d* of the arm or latch, this keeper being in the present instance of the usual form, with the addition of two inclined planes, which are formed by a flange or rib, E, on the outside, and at that edge of the keeper which adjoins the case of the lock when the door is closed.

In the present instance the two inclined planes, which are inclined in contrary directions, meet at the point *h*, the latter being the most prominent part of the rib or flange E, and from this point the flange is inclined to the ends or nearly to the ends of the keeper, as seen in Fig. 2.

On closing the door the inclined edge of the portion *d* of the latch will come in contact with and be forced against one of the inclined planes of the keeper. The latch consequently recedes and disappears within the lock until the pointed end passes the edge of the keeper, when the spring *g* will at once cause the angular portion *d* of the arm or latch to take its proper place behind the keeper.

Owing to the employment of two inclined planes on the keeper, the latter may be secured, either end uppermost, to the door-jamb, and is consequently applicable either to a right or left handed door-casing.

The lock itself can also be used in the same manner as other Janus-faced locks, on either a left or right handed door, as the reversing of the lock in no way affects the action of the latch.

I wish it to be understood that I do not desire to claim, broadly, as the invention of the said W. S. KIRKHAM, a keeper with two inclined planes or combination with the latch of a Janus-faced lock, nor do I desire to limit the claim to the precise form and arrangement of the parts described, as it will be evident that the two inclined planes may be arranged on the keeper, and the vibrating latch hung to the lock in a manner differing from that illustrated and described; but

I claim as the invention of the said W. S. KIRKHAM—

The keeper D, having two inclined planes, in combination with a latch so pivoted to a Janus-faced lock and so arranged in respect to the inclinations of the keeper that whether the latter be applied to a left or right handed door-casing, one or other of the said inclined planes shall, on closing the door, cause the latch to move on its pivot and direct the outer end into or behind the keeper, as described.

In testimony whereof I have signed my name to this specification before two subscribing witnesses.

CHARLES A. MILLER.

Witnesses:
J. P. AUCKER,
R. T. KNIGHT.